(12) United States Patent
Walcott

(10) Patent No.: US 12,670,275 B2
(45) Date of Patent: Jun. 30, 2026

(54) CONFIGURATION DATA PROTECTION

(71) Applicant: Target Brands, Inc., Minneapolis, MN (US)

(72) Inventor: Clark Walcott, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 156 days.

(21) Appl. No.: 18/437,822

(22) Filed: Feb. 9, 2024

(65) Prior Publication Data

US 2025/0258944 A1     Aug. 14, 2025

(51) Int. Cl.
*G06F 21/62* (2013.01)
*G06F 8/71* (2018.01)

(52) U.S. Cl.
CPC ............ *G06F 21/6209* (2013.01); *G06F 8/71* (2013.01)

(58) Field of Classification Search
CPC ... H04W 12/03; H04W 8/205; H04W 12/069; H04W 84/06
USPC ........................................................ 380/270
See application file for complete search history.

(56) References Cited

U.S. PATENT DOCUMENTS

| | | | |
|---|---|---|---|
| 8,495,614 B2 | 7/2013 | Kurtakov | |
| 10,162,630 B2 | 12/2018 | Bouley et al. | |
| 11,157,249 B1 | 10/2021 | Rapson et al. | |
| 2013/0297761 A1* | 11/2013 | Zarzycki | H04L 67/5651 |
| | | | 709/223 |

| | | | |
|---|---|---|---|
| 2016/0132328 A1* | 5/2016 | Bouley | G06F 8/60 |
| | | | 717/121 |
| 2017/0140132 A1* | 5/2017 | Yu | G06F 21/6218 |
| 2022/0188444 A1* | 6/2022 | Stoler | H04L 9/006 |
| 2022/0283886 A1 | 9/2022 | Brown | |
| 2023/0237148 A1* | 7/2023 | Shaon | G06F 21/54 |
| | | | 726/1 |

FOREIGN PATENT DOCUMENTS

WO      2005074621 A2      8/2005

OTHER PUBLICATIONS

MrSSS16, Golang sharing configurations between packages, Retrieved from: https://stackoverflow.com/questions/36528091/golang-sharing-configurations-between-packages, 5 pages, Apr. 10, 2016.
Parcel, Configuration, Retrieved from: https://parceljs.org/plugin-system/configuration/, 3 pages, May 16, 2023.
Spring, Externalized Configuration, Retrieved from: https://docs.spring.io/spring-boot/docs/1.5.22.RELEASE/reference/html/boot-features-external-config.html, 18 pages, May 16, 2023.
Teichmann, Build once, deploy many in React: Dynamic configuration properties, 16 pages, Feb. 22, 2021.

* cited by examiner

*Primary Examiner* — Tan Doan
(74) *Attorney, Agent, or Firm* — Theodore M. Magee; Westman, Champlin & Koehler, P.A.

(57)     ABSTRACT

A method includes in a first package, defining a data type as implementing a method that returns a copy of a protected configuration value and in a second package, providing a function that accepts a variable of the data type and that calls the method to obtain the copy of the protected configuration value. The first package and the second package are imported into a common package so that the function in the second package can obtain the copy of the protected configuration value without being able to modify the protected configuration value.

7 Claims, 10 Drawing Sheets

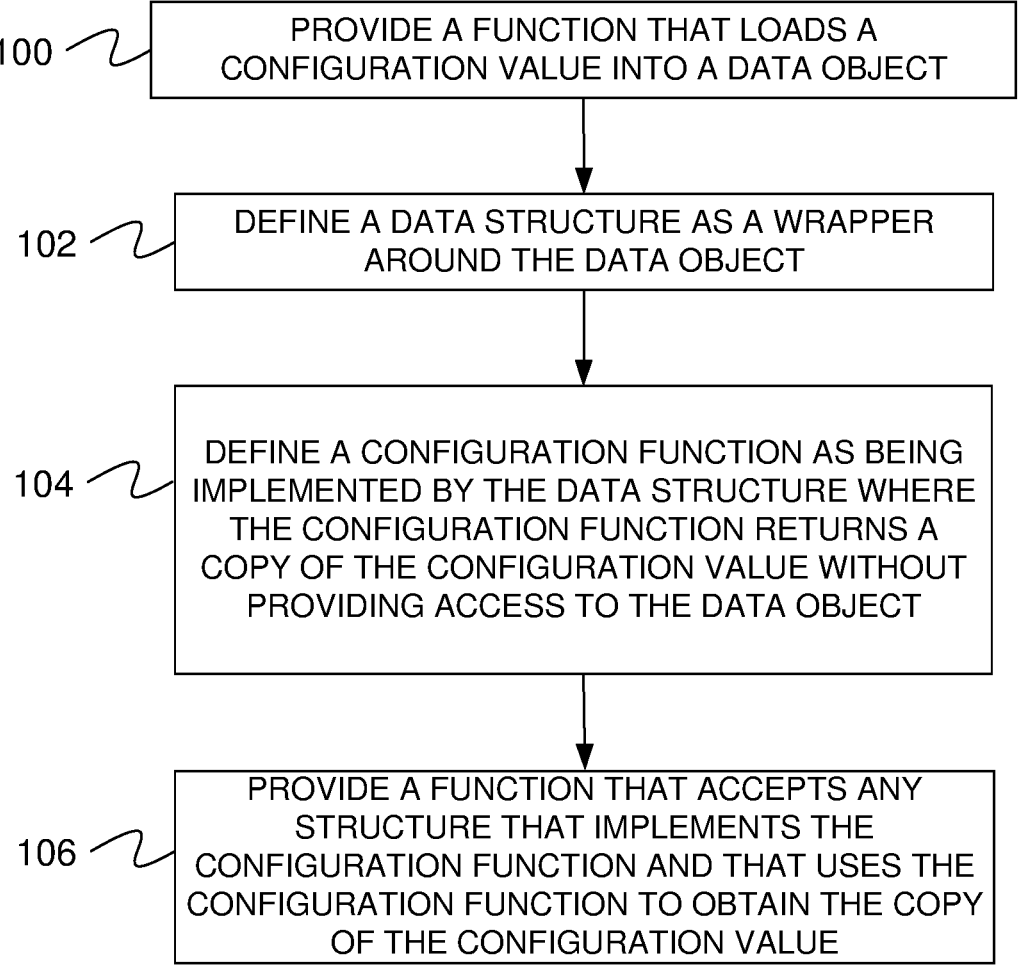

100    PROVIDE A FUNCTION THAT LOADS A CONFIGURATION VALUE INTO A DATA OBJECT

102    DEFINE A DATA STRUCTURE AS A WRAPPER AROUND THE DATA OBJECT

104    DEFINE A CONFIGURATION FUNCTION AS BEING IMPLEMENTED BY THE DATA STRUCTURE WHERE THE CONFIGURATION FUNCTION RETURNS A COPY OF THE CONFIGURATION VALUE WITHOUT PROVIDING ACCESS TO THE DATA OBJECT

106    PROVIDE A FUNCTION THAT ACCEPTS ANY STRUCTURE THAT IMPLEMENTS THE CONFIGURATION FUNCTION AND THAT USES THE CONFIGURATION FUNCTION TO OBTAIN THE COPY OF THE CONFIGURATION VALUE

FIG. 1

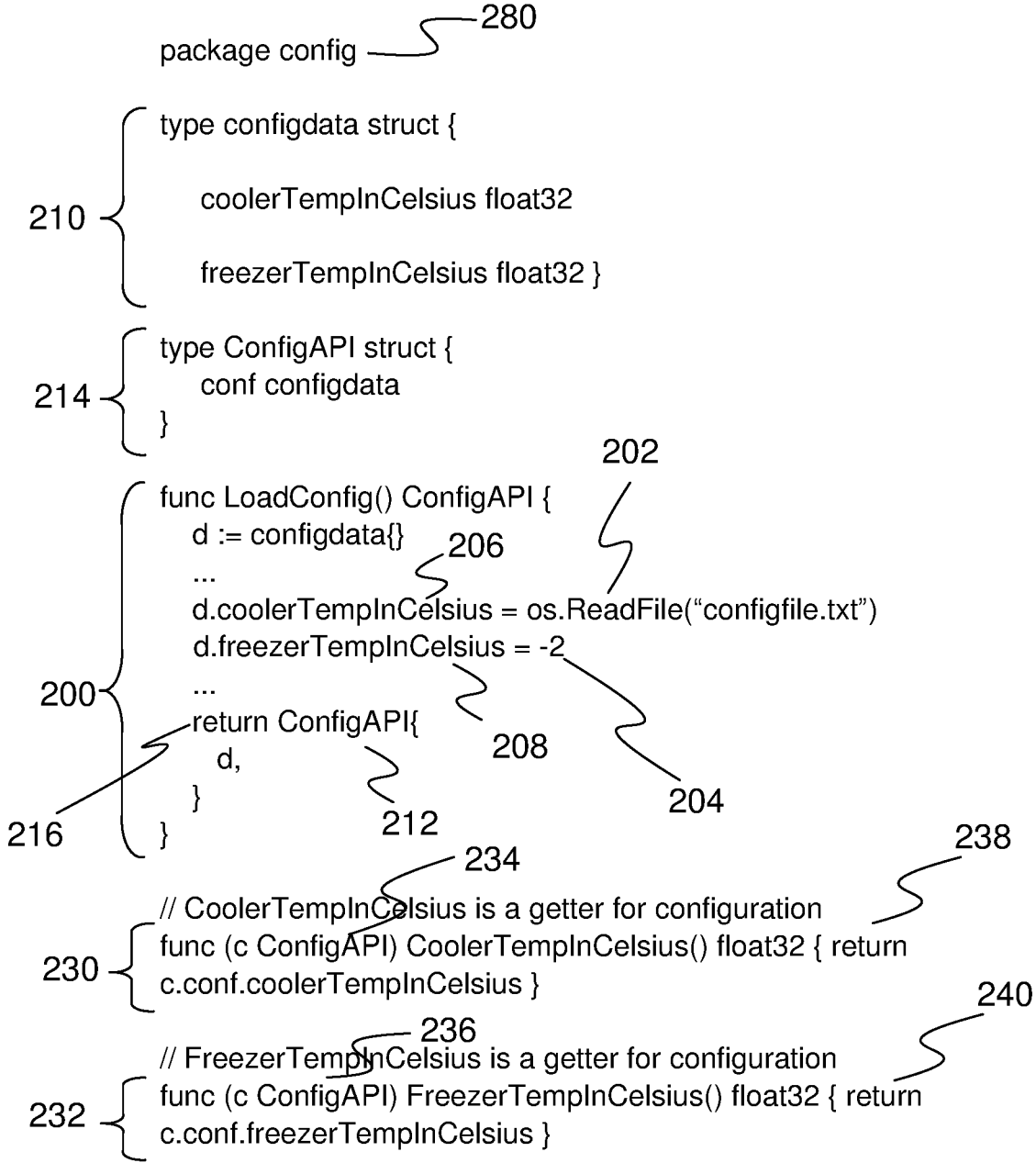

```
package config ⟍280 type configdata struct { coolerTempInCelsius float32 freezerTempInCelsius float32 } type ConfigAPI struct {
    conf configdata
}
                                          202
func LoadConfig() ConfigAPI {
    d := configdata{}    206
    ...
    d.coolerTempInCelsius = os.ReadFile("configfile.txt")
    d.freezerTempInCelsius = -2
    ...
    return ConfigAPI{
        d,
    }                   208
}                 212          204
                    234                     238
// CoolerTempInCelsius is a getter for configuration
func (c ConfigAPI) CoolerTempInCelsius() float32 { return
c.conf.coolerTempInCelsius }
                                              240
        236
// FreezerTempInCelsius is a getter for configuration
func (c ConfigAPI) FreezerTempInCelsius() float32 { return
c.conf.freezerTempInCelsius }
```

```
package cooleroperations                          350 type coolerconfigmethods interface {
    CoolerTempInCelsius() float32
}                                                 304 import (some_cooler_library)

type cooler struct {
    api some_cooler_library.Controller
} func (c *cooler) setTemp(tempInCelsius float32) {
    c.api.SetTemp(tempInCelsius) }
                                                  302 func StartCooler(coolerconf coolerconfigmethods)
{    c := &cooler{
        api: some_cooler_library.New(),
    }
    c.setTemp(coolerconf.CoolerTempInCelsius())
}                                                 300
                                                  320
```

FIG. 3

```
package freezeroperations                        450 type freezerconfigmethods interface {
    FreezerTempInCelsius() float32
} import (some_freezer_library)

type freezer struct {
    api some_freezer_library.Controller
} func (f *freezer) setTemp(tempInCelsius float32) {
    f.api.SetTemp(tempInCelsius) }
                                            402 func StartFreezer(freezerconf freezerconfigmethods)
{    f := &freezer{
        api: some_freezer_library.New(),
    }
    f.setTemp(freezerconf.FreezerTempInCelsius())
}
```

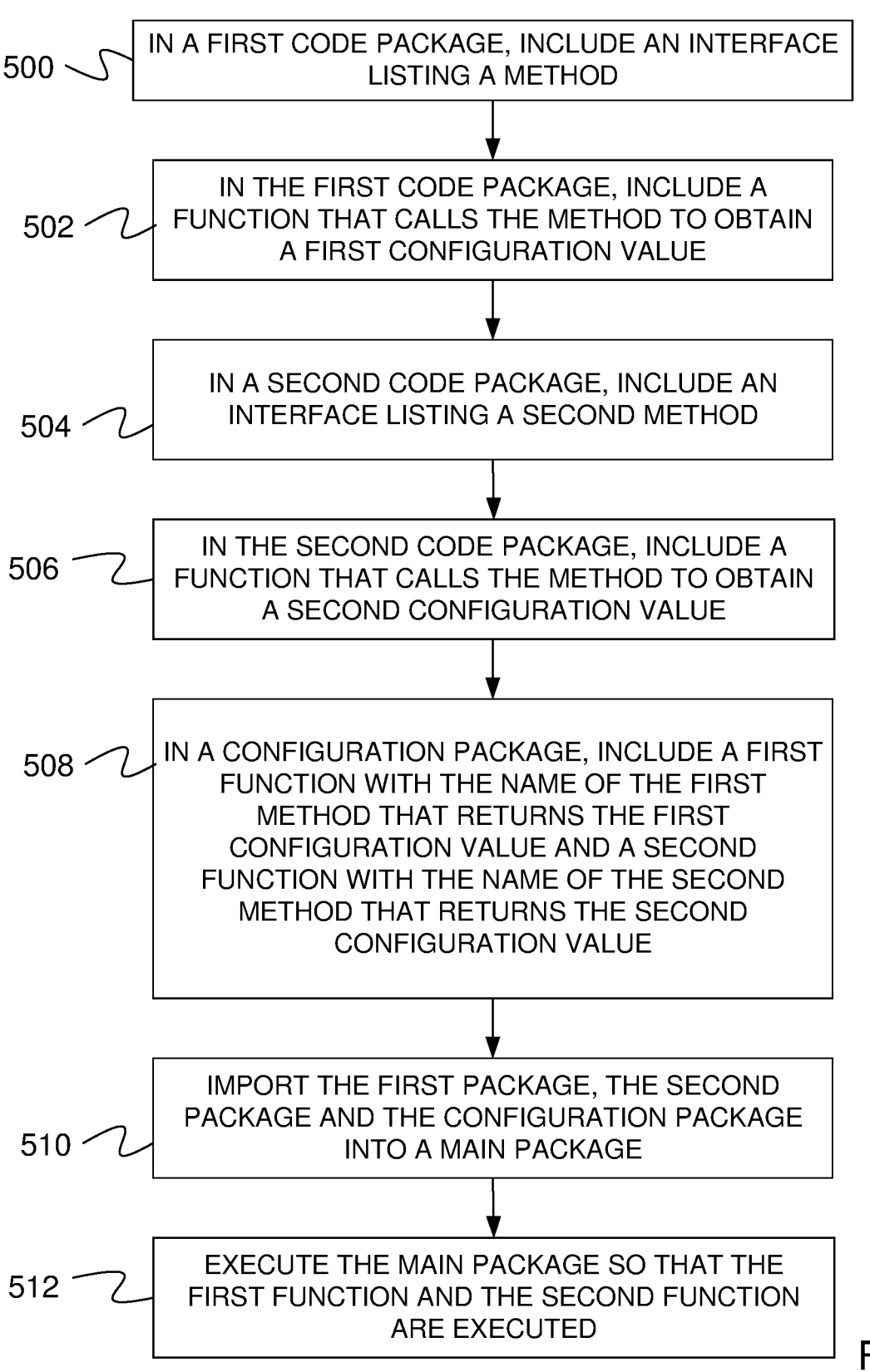

500 — IN A FIRST CODE PACKAGE, INCLUDE AN INTERFACE LISTING A METHOD

502 — IN THE FIRST CODE PACKAGE, INCLUDE A FUNCTION THAT CALLS THE METHOD TO OBTAIN A FIRST CONFIGURATION VALUE

504 — IN A SECOND CODE PACKAGE, INCLUDE AN INTERFACE LISTING A SECOND METHOD

506 — IN THE SECOND CODE PACKAGE, INCLUDE A FUNCTION THAT CALLS THE METHOD TO OBTAIN A SECOND CONFIGURATION VALUE

508 — IN A CONFIGURATION PACKAGE, INCLUDE A FIRST FUNCTION WITH THE NAME OF THE FIRST METHOD THAT RETURNS THE FIRST CONFIGURATION VALUE AND A SECOND FUNCTION WITH THE NAME OF THE SECOND METHOD THAT RETURNS THE SECOND CONFIGURATION VALUE

510 — IMPORT THE FIRST PACKAGE, THE SECOND PACKAGE AND THE CONFIGURATION PACKAGE INTO A MAIN PACKAGE

512 — EXECUTE THE MAIN PACKAGE SO THAT THE FIRST FUNCTION AND THE SECOND FUNCTION ARE EXECUTED

FIG. 5

```
package main import (
        "config"
         "cooleroperations"
          "freezeroperations")

func main() {
    c := config.LoadConfig()                    602

//LoadConfig returns a wrapper around the concrete data
    //we pass a pointer to the data object so that it can
    //be used as the interface type cooler := cooleroperations.StartCooler(&c)
    freezer := freezeroperations.StartFreezer(&c)

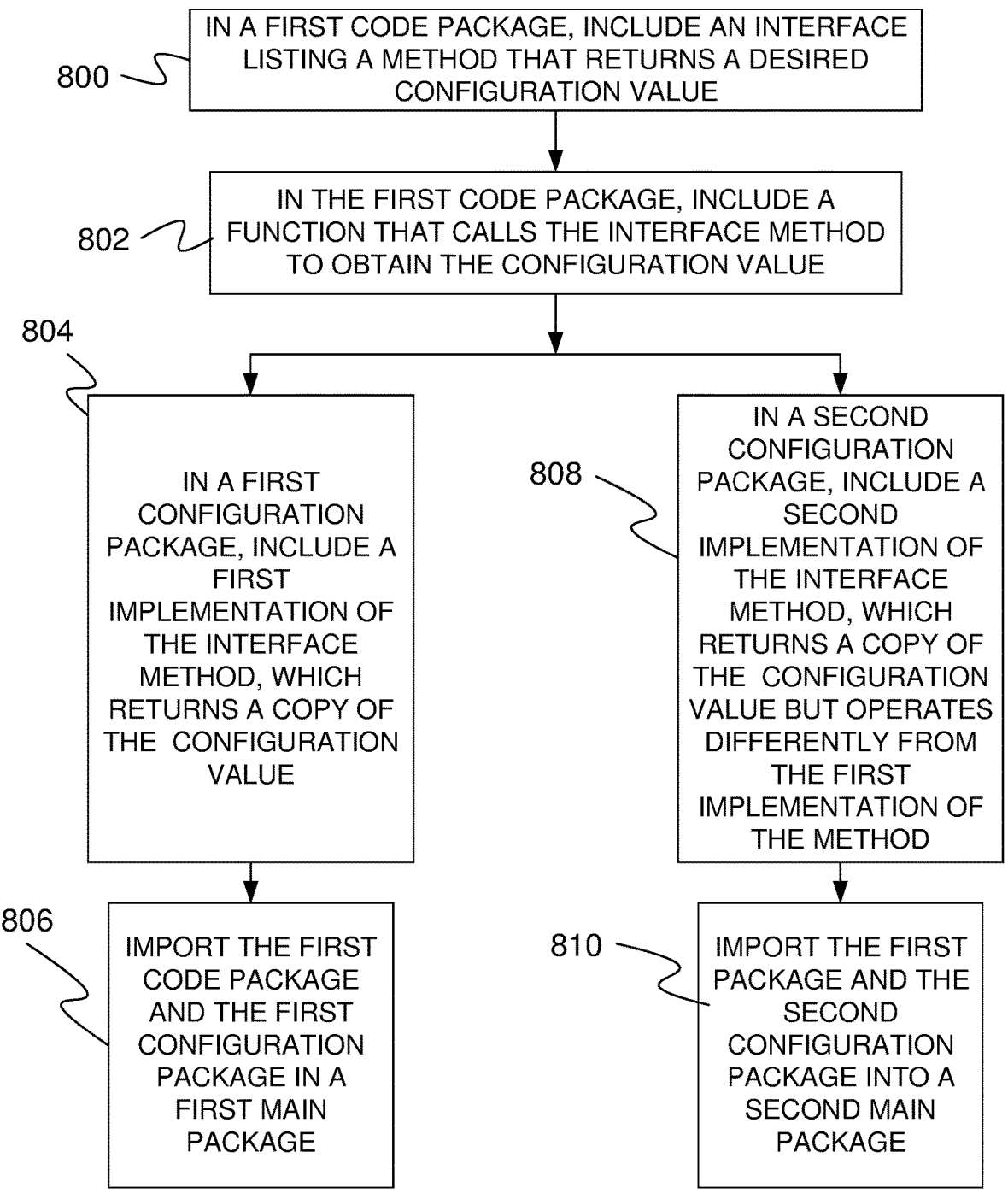

800 — IN A FIRST CODE PACKAGE, INCLUDE AN INTERFACE LISTING A METHOD THAT RETURNS A DESIRED CONFIGURATION VALUE

802 — IN THE FIRST CODE PACKAGE, INCLUDE A FUNCTION THAT CALLS THE INTERFACE METHOD TO OBTAIN THE CONFIGURATION VALUE

804 — IN A FIRST CONFIGURATION PACKAGE, INCLUDE A FIRST IMPLEMENTATION OF THE INTERFACE METHOD, WHICH RETURNS A COPY OF THE CONFIGURATION VALUE

808 — IN A SECOND CONFIGURATION PACKAGE, INCLUDE A SECOND IMPLEMENTATION OF THE INTERFACE METHOD, WHICH RETURNS A COPY OF THE CONFIGURATION VALUE BUT OPERATES DIFFERENTLY FROM THE FIRST IMPLEMENTATION OF THE METHOD

806 — IMPORT THE FIRST CODE PACKAGE AND THE FIRST CONFIGURATION PACKAGE IN A FIRST MAIN PACKAGE

810 — IMPORT THE FIRST PACKAGE AND THE SECOND CONFIGURATION PACKAGE INTO A SECOND MAIN PACKAGE

FIG. 8

```
package configtwo type configdata struct { coolerTempInCelsius float32 freezerTempInCelsius float32 } type ConfigAPI struct {
    conf configdata
} func LoadConfig() ConfigAPI {
    d := configdata{}
    ...
    d.coolerTempInCelsius = 5
    d.freezerTempInCelsius = -2
    ...
    return ConfigAPI{
      d,
    }
}

// CoolerTempInCelsius is a getter for configuration
func (c ConfigAPI) CoolerTempInCelsius() float32 { return
c.conf.coolerTempInCelsius }

// FreezerTempInCelsius is a getter for configuration
func (c ConfigAPI) FreezerTempInCelsius() float32 { return
c.conf.freezerTempInCelsius }
```

FIG. 9

CONFIGURATION DATA PROTECTION

BACKGROUND

In many computing languages, it is common to provide a configuration file that contains values for various constants and variables used in a particular computer program. Such configuration files are read during execution of the computer program to obtain the values of the constants and variables.

The discussion above is merely provided for general background information and is not intended to be used as an aid in determining the scope of the claimed subject matter. The claimed subject matter is not limited to implementations that solve any or all disadvantages noted in the background.

SUMMARY

A method includes importing a first code package, a second code package and a configuration package into a main code package such that the configuration package provides instructions for loading first configuration data used by the first code package and second configuration data used by the second code package into data objects. The configuration package prevents the first code package and the second code package from accessing the data objects directly and the configuration package provides a first method that returns at least one value of the first configuration data and a second method that returns at least one value of the second configuration data. The first code package includes an interface that references the first method and a function that utilizes the at least one value returned by the first method. The second code package includes an interface that references the second method and a function that utilizes the at least one value returned by the second method.

In accordance with a further embodiment, a method includes in a configuration package, defining a data type as implementing a method that returns a copy of a protected configuration value and in a code package, providing a function that accepts a variable of the data type and that calls the method to obtain the copy of the protected configuration value. The configuration package and the code package are imported into a main package so that the function in the code package can obtain the copy of the protected configuration value without being able to modify the protected configuration value.

In accordance with a still further embodiment, a computer-readable medium has stored thereon instructions that cause a processor to perform steps including executing a first main code package having a first configuration package that defines a data type as implementing a first version of a method and that returns a copy of a protected configuration value for a configuration variable and a first code package that provides a function that accepts a variable of the data type and that calls the first version of the method to obtain the copy of the protected configuration value. A second main code package includes a second configuration package that defines a data type as implementing a second version of the method and that returns a copy of a second protected configuration value for the configuration variable and the first code package, wherein the function of the first code package calls the second version of the method to obtain the copy of the second protected configuration value.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1 is a flow diagram of a method of providing a copy of configuration data without giving access to data objects.

FIG. 2 is a configuration code package in accordance with one embodiment.

FIG. 3 is a first code package in accordance with one embodiment.

FIG. 4 is a second code package in accordance with one embodiment.

FIG. 5 is a flow diagram of a method of providing two code packages that obtain different configuration values and are prevented from accessing data objects for other configuration values.

FIG. 6 is a common code package.

FIG. 8 is a method importing a code package into different common code packages with different configuration packages.

FIG. 9 is an example of a second configuration package.

DETAILED DESCRIPTION

Figure 7:
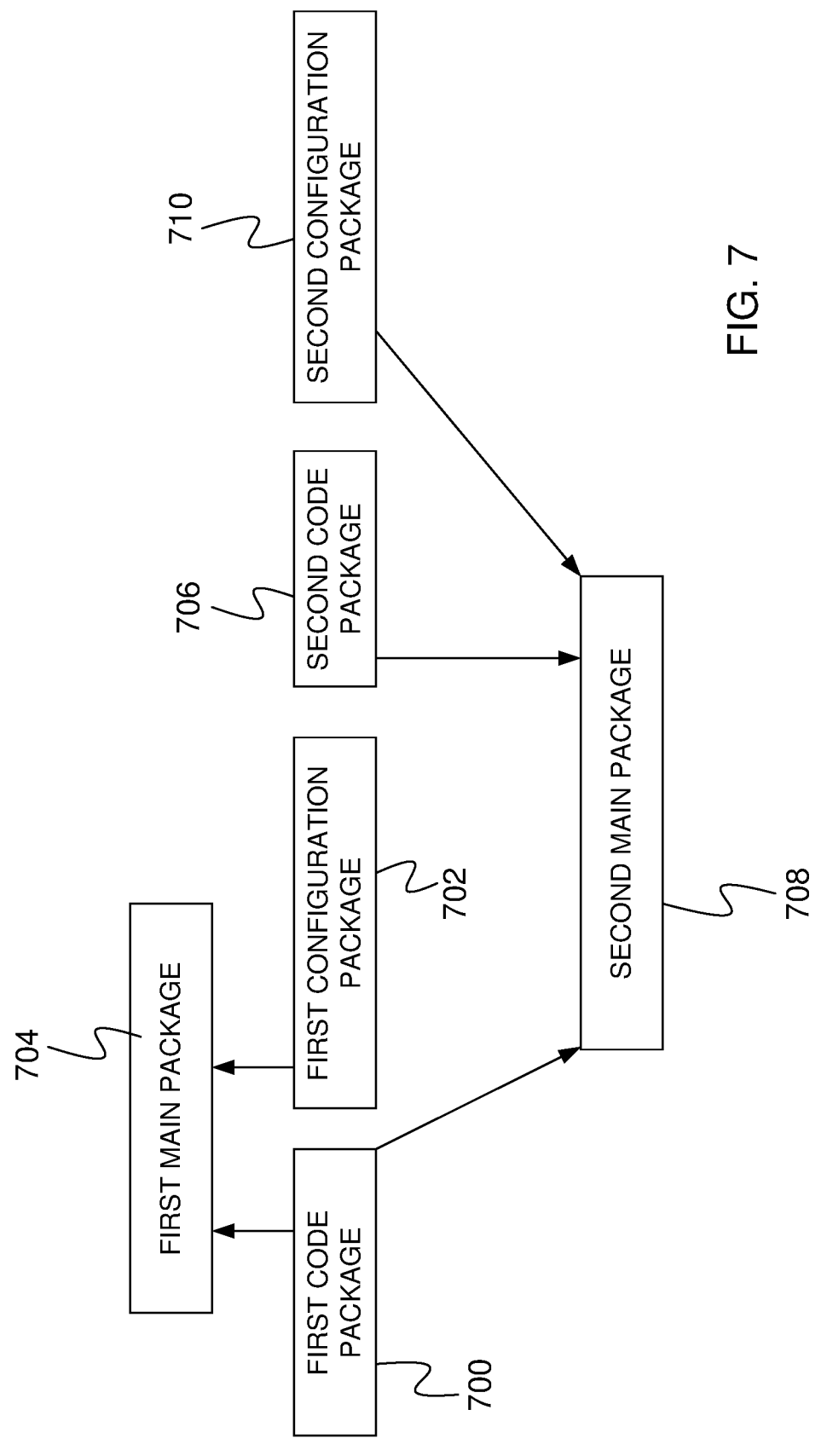
FIG. 7 is a block diagram of a system in which a code package is imported into different common code packages with different configuration packages that operate differently from each other.

Instead of having each function that needs a configuration value read the configuration file, which would be computationally expensive, most systems load a set of data objects using a single read of the configuration file or configuration database near the beginning of a program's execution. In such systems, functions that need the value of a particular constant or variable found in the configuration file do not read the file but instead reference the data object.

Such systems are less than ideal in large-scale environments where there are a number of different programmers working on different parts of the code because each programmer's code has full access to all of the data objects. As a result, it is possible for one programmer to change a configuration value used by another programmer's code. This leads to instability in the code.

In the discussion below, computer instructions are divided into packages and one or more packages are importable into other packages so that some of the data definitions and functions in an imported package become available to the importing package.

As discussed further below, the embodiments utilize a configuration package that reads configuration values into data objects and defines a collection of methods, where each method will return a copy of the value of a data object. A package that needs configuration values provides a list of the methods it will invoke to acquire those configuration values. During compilation, the package is only given access to the methods that it lists and cannot access the data objects in the configuration package. This results in more secure code that is less likely to fail because of an unexpected change to a configuration data object.

FIG. 1 provides a flow diagram of a method in accordance with one embodiment and FIG. 2 provides exemplary computer instructions/computer code that are formed through the method of FIG. 1.

In step 100 of FIG. 1, a function that loads a value of a configuration variable into a data object is provided. In FIG. 2, function 200 is an example of a function that loads values 202 and 204 into respective data objects 206 and 208, which are defined in type statement 210.

In step 102, a data structure 212 is defined as a wrapper around data objects 206 and 208 as shown in return statement 216 of function 200 and type statement 214.

In step 104, a configuration function, such as configuration functions 230 and 232, is declared as being implemented by the wrapper data structure. In FIG. 2, this is done using the receivers 234 and 236 in function declarations 230 and 232, which declare that any variable of type ConfigApi can implement the respective functions. Thus, any variable that is a wrapper data structure can implement the respective functions.

Each of function declarations 230 and 232 returns a copy of a respective configuration value when called as indicated by return statements 328 and 240. Note that the return statements do not provide access to the "d" data object or the "coolerTempInCelsius" or the "freezerTempInCelsius" data objects. The return statements simply provide a copy of the values held by those data objects. As a result, the functions that call declared functions 230 and 232 cannot modify the content of any of the data objects created by function 200.

At step 106 of FIG. 1, a function is declared that accepts any structure that implements the configuration function and that uses the configuration function to obtain the copy of the value. For example, in FIG. 3 a function 300 is declared that accepts any structure of the "coolerconfigmethods" type 302, where the "coolerconfigmethods" type is defined as an interface type in declaration 304. An interface type provides a list of functions that a data object must implement in order to satisfy the requirements of the interface. Any data object that implements all of the functions listed in the interface declaration can be used as a variable of that interface's type. For example, in FIG. 3, since interface declaration 304 for the "coolerconfigmethods" type lists only one method, the "CoolerTempInCelsius( )" method, any data object that implements the "CoolerTempInCelsius( )" method can be used as a variable of the type "coolerconfigmethods." As such, function 300 will accept any data type as an input value if the data type implements a function with the name of "CoolerTempInCelsius( )". Similarly, in FIG. 4, a function 400 is declared that accepts any structure of the "freezerconfigmethods" type 402, where the "freezerconfigmethods" type is defined as an interface type in declaration 404. Since interface declaration 404 only includes a single method, "FreezerTempInCelsius( )", function 400 will accept any data type as an input value if the data type implements a function with the name of "FreezerTempInCelsius( )." Note that interface declarations 304 and 404 could include multiple methods. When multiple methods are provided in such an interface declaration, the data object must implement every method listed in the interface declaration in order to be accepted as the input variable for function 300 or function 400.

Within function 300, a function call 320 uses the configuration function 230 of FIG. 2 to obtain a configuration value. Note that function call 320 only returns the configuration value and does not provide access to the underlying data object that the configuration value is stored in by function 200. Similarly, within function 400, a function call 420 uses the configuration function 232 of FIG. 2 to obtain a second configuration value without obtaining access to the underlying object that the second configuration value is stored in.

FIG. 5 provides a flow diagram of a method of constructing a common package that allows packages within the common package to obtain copies of configuration values from a configuration package in the common package without obtaining access to the data objects that hold the values in the configuration package.

In step 500, an interface declaration is included in a first code package that lists a method for obtaining a copy of a first configuration value. For example, in FIG. 3, interface 304 is included in the cooleroperations code package 350 and lists the method CoolerTempInCelsius that is used to obtain a configuration value for a cooler temperature.

In step 502, a function that calls the method to obtain the first configuration value is included in the first code package. For example, function 300 of cooleroperations code package 350 calls the CoolerTempInCelsius method using a function call 320.

In step 504, an interface declaration is included in a second code package that lists a second method for obtaining a copy of a second configuration value. For example, in FIG. 4, interface 404 is included in the freezeroperations code package 450 and lists the method FreezerTempInCelsius that is used to obtain a configuration value for a freezer temperature.

In step 506, a function that calls the method to obtain the second configuration value is included in the second code package. For example, function 400 of freezeroperations code package 450 calls the FreezerTempInCelsius method using a function call 420.

In step 508, a first function with the name of first method that returns the first configuration value and a second function with the name of the second method that returns the second configuration file are included in a configuration package. For example, in FIG. 2, function 230, which has the name of the first method CoolerTempInCelsius found in interface 304, returns the first configuration value when called and function 232, which has the name of the second method FreezerTempInCelsius found in interface 404, returns the second configuration value when called.

In step 510, the first code package, the second code package and the configuration package are imported into a main package. For example, in FIG. 6 a main is shown to import the first code package "cooleroperations", the second code package "freezer operations" and the configuration package "config" in import statement 600.

In step 512, the main package is executed so that the first function and the second function are executed.

For example, as shown in FIG. 6, when the main package is executed, it begins by calling the LoadConfig( ) function of the "config" package at instruction 602. The LoadConfig( ) function is shown as function 200 in FIG. 2 and includes instructions that obtain configuration values and that load these configuration values into data objects. For example, instruction 250 obtains a first configuration value by reading the value from the file "configfile.txt." This value is stored in the data object "d" as "d.coolerTempInCelsius". Instruction 252 obtains a second configuration value through a hard coding of −2 written into instruction 252. Note that although a file reading and hard coding examples are provided in FIG. 2, other methods of obtaining values may be used such as database calls.

The data objects that are written to in the LoadConfig( ) function are wrapped in a ConfigAPI wrapper in return instruction 216. As a result, in instruction 602 of FIG. 6, the variable "c" is a ConfigAPI data structure that wraps a copy of the data held in data object "d" of the LoadConfig( ) function of FIG. 2.

Next, instruction 606 of FIG. 6 is executed. This instruction calls the StartCooler function 300 of FIG. 3 while providing a pointer to "c" as the input variable. As shown in FIG. 3, function 300 requires that the variable passed into StartCooler must support the coolerconfigmethods interface 304. As such, the variable must be a data type that can implement the methods of interface 304. In this case, since "c" has a ConfigAPI type, and since declaration 230 of FIG. 2 indicates that a variable of the ConfigAPI type is a receiver of the CoolerTempInCelsius( ) method of FIG. 2, the variable "c" in FIG. 6 can implement method 230 of FIG. 2. As a result, the compiler does not throw an exception.

When the StartCooler function 300 executes, the data and methods of variable "c" of FIG. 6 are assigned to the variable "coolerconf". As a result, the instruction "coolerconf.CoolerTempInCelsius" 320 in function 300 is a call to variable c's implementation of the CoolerTempInCelsius method. This implementation is function 230 of FIG. 2 since "c" is a ConfigAPI data structure and such data structures are designated as receivers of function 230. Thus, function 230 is executed and returns a copy of the configuration value stored in the coolerTempInCelsius data object as "c.conf.coolerTempInCelsius" to StartCooler function 300 of FIG. 3. The configuration value returned by function 230 is then submitted as an input value to a setTemp function that uses the configuration value to determine what temperature to set a cooler to.

Next, instruction 608 of FIG. 6 is executed. This instruction calls the StartFreezer function 400 of FIG. 4 while providing a pointer to "c" as the input variable. As shown in FIG. 4, function 400 requires that the variable passed into StartFreezer must support the freezerconfigmethods interface 404. As such, the variable must be a data type that can implement the methods of interface 404. In this case, since "c" has a ConfigAPI type, and since declaration 232 of FIG. 2 indicates that a variable of the ConfigAPI type is a receiver of the FreezerTempInCelsius( ) method of FIG. 2, the variable "c" in FIG. 6 can implement method 232 of FIG. 2. As a result, the compiler does not throw an exception.

When StartFreezer function 400 executes, the data and methods of variable "c" of FIG. 6 are assigned to the variable "freezerconf". As a result, the instruction "freezerconf.FreezerTempInCelsius" 420 in function 400 is a call to variable c's implementation of the FreezerTempInCelsius method. This implementation is function 232 of FIG. 2 since "c" is a ConfigAPI data structure and such data structures are designated as receivers of function 232. Thus, function 232 is executed and returns a copy of the configuration value stored in the freezerTempInCelsius data object as "c.conffreezerTempInCelsius" to StartFreezer function 400 of FIG. 4. The configuration value returned by function 232 is then submitted as an input value to a setTemp function that uses the configuration value to determine what temperature to set a freezer to.

Note that in the example above, instructions in code package 350 do not have access to any configuration value other than the configuration values provided by the methods listed in interface declaration 304. Similarly, instructions in code package 450 do not have access to any configuration value other than the configuration values provided by the methods listed in interface declaration 404. This makes the instructions in code package 350 and 450 more robust.

Although not shown in the example above, different code packages can include the same methods in their interface declarations such that instructions in multiple different code packages can obtain a copy of the same configuration value.

The system of the various embodiments also permits a code package to be used with different configuration packages without re-coding the code package. Each configuration package can obtain the configuration values used by the code package in different ways. The only requirement is that each configuration package must implement the methods called by the code package to obtain the copies of the configuration values.

FIG. 7 provides a block diagram showing the ability of a code package to be used with different configuration packages and FIG. 8 provides a method of such a system.

In step 800 of FIG. 8, an interface is declared in a first code package 700 that lists a method used to obtain a configuration value. For example, in FIG. 3, interface 304 is included in code package 350 and includes the CoolerTempInCelsius( ) method that is used to obtain a configuration temperature for a cooler. In step 802, a function that calls the method is included in first code package 700. For example, in FIG. 3, function 300 that includes a function call 320 to the CoolerTempInCelsius( ) method is include in code package 350.

In step 804, a first function is included in a first configuration package 702 as a first implementation of the method in the interface of first code package 700. The first function returns a copy of the configuration value to the calling function in first code package 700. For example, function 230 is included in configuration package 280.

At step 806, first code package 700 and first configuration package 702 are imported into a first main package 704. For example, in FIG. 6, import statement 600 imports config package 280 and cooleroperations package 250 into a main package.

At step 808, a second function that provides a second implementation of the method is defined in a second configuration package 710 where the second function returns the configuration value but the second configuration package 710 operates differently from the first configuration package. For example, in FIG. 9, a second configuration package obtains the value for the coolerTempInCelsius variable through hard coding instead of through a file reading as was done in the first configuration package of FIG. 2.

At step 810, the first code package 700 and the second configuration package are imported into a second common package 708 so that the function of the first code package obtains the configuration value from the second implementation of the method found in the second configuration package 710 instead of through the first implementation of the method found in the first configuration package 700.

The ability to use the first code package with multiple different configuration packages simplifies testing because it allows the code package to be tested with a simpler configuration package and once the code package has passed unit testing, it can be combined with a more sophisticated configuration package and with other code packages, such as second code package 706 of FIG. 7, which is imported into second main package 708. This reduces the complexity of testing by allowing errors in the first code package to be isolated before the first code package is combined with the more sophisticated configuration package and before the first code package is combined with other code packages.

Figure 10:
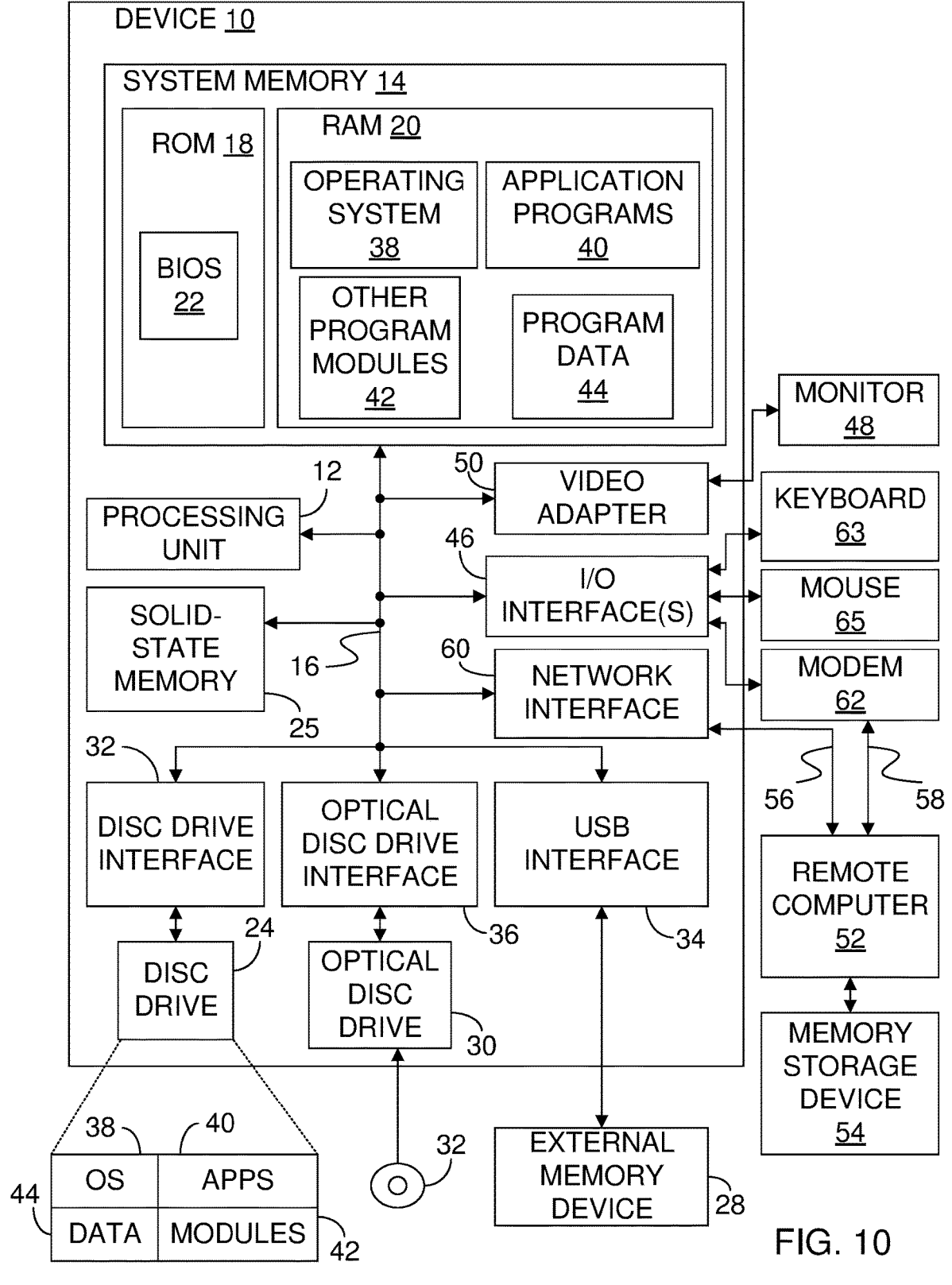
FIG. 10 provides a block diagram of a computing system that implements the various embodiments.

The system discussed above is implemented on a computing device, an example of which is shown in FIG. 10. Computing device 10 of FIG. 10 includes a processing unit 12, a system memory 14 and a system bus 16 that couples the system memory 14 to the processing unit 12. System memory 14 includes read only memory (ROM) 18 and random-access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Computing device 10 further includes an optional hard disc drive 24, an optional external memory device 28, and an optional optical disc drive 30. External memory device 28 can include an external disc drive or solid-state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable media provide nonvolatile storage media for the computing device 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include programs for implementing any one of the applications discussed above. Program data 44 may include any data used by the systems and methods discussed above.

Processing unit 12, also referred to as a processor, executes programs in system memory 14 and solid-state memory 25 to perform the methods described above.

Input devices including a keyboard 63 and a mouse 65 are optionally connected to system bus 16 through an Input/Output interface 46 that is coupled to system bus 16. Monitor or display 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 10. The network connections depicted in FIG. 10 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to the computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 10 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A method comprising:
importing a first code package, a second code package and a configuration package into a main code package, wherein:
the configuration package provides instructions for loading first configuration data used by the first code package and second configuration data used by the second code package into data objects wrapped by a data structure;
the configuration package prevents the first code package and the second code package from accessing the data objects directly;
the data structure implements a first method that returns a copy of at least one data object loaded with the first configuration data and a second method that returns a copy of at least one data object loaded with the second configuration data;
the first code package includes an interface that references the first method and a function that receives a pointer to the data structure and utilizes the copy of the at least one data object returned by the data structure implementing first method; and
the second code package includes an interface that references the second method and a function that receives a pointer to the data structure and utilizes the copy of the at least one data object returned by data structure implementing the second method.

2. The method of claim 1 wherein the data objects are part of a single data structure that implements both the first method and the second method.

3. The method of claim 1 wherein the first code package can be imported into a different main code package together with a second configuration package that provides a different implementation of the first method.

4. The method of claim 3 wherein the second code package can be imported into a different main code package together with a third configuration package that provides a different implementation of the second method.

5. The method of claim 1 wherein the first code package can be imported into a different main code package together with a second configuration package that does not provide an implementation of the second method.

6. The method of claim 5 wherein the second code package can be imported into a different main code package together with a third configuration package that does not provide an implementation of the first method.

7. The method of claim 1 wherein instructions in the first code package are prevented from changing the second configuration data loaded into the data objects.

* * * * *